(12) United States Patent
Fowler et al.

(10) Patent No.: US 12,361,628 B2
(45) Date of Patent: Jul. 15, 2025

(54) CONFIGURABLE MULTIPLE-DIE GRAPHICS PROCESSING UNIT

(71) Applicant: ADVANCED MICRO DEVICES, INC., Santa Clara, CA (US)

(72) Inventors: Mark Fowler, Boxborough, MA (US); Samuel Naffziger, Ft. Collins, CO (US); Michael Mantor, Orlando, FL (US); Mark Leather, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 143 days.

(21) Appl. No.: 18/077,424

(22) Filed: Dec. 8, 2022

(65) Prior Publication Data
US 2024/0193844 A1    Jun. 13, 2024

(51) Int. Cl.
G06F 15/00 (2006.01)
G06F 9/38 (2018.01)
G06T 15/00 (2011.01)

(52) U.S. Cl.
CPC .......... *G06T 15/005* (2013.01); *G06F 9/3802* (2013.01)

(58) Field of Classification Search
None
See application file for complete search history.

(56) References Cited

U.S. PATENT DOCUMENTS

| | | | |
|---|---|---|---|
| 11,295,507 B2 | 4/2022 | Leather et al. | |
| 2013/0194286 A1 | 8/2013 | Bourd et al. | |
| 2017/0177052 A1 | 6/2017 | Huang | |
| 2018/0082470 A1* | 3/2018 | Nijasure | G06T 15/005 |
| 2019/0050040 A1* | 2/2019 | Baskaran | G06N 3/063 |
| 2021/0097013 A1 | 4/2021 | Saleh et al. | |
| 2021/0272229 A1* | 9/2021 | McCrary | G06F 9/5027 |

FOREIGN PATENT DOCUMENTS

KR    10-2020-0145665    12/2020

OTHER PUBLICATIONS

International Search Report and Written Opinion issued in Application No. PCT/US2023/082525, mailed Apr. 8, 2024, 11 pages.
Apple Inc., Apple Newsroom, Mar. 8, 2022, "Apple Unveils M1 Ultra, the World's Most Powerful Chip for a Personal Computer." <https://www.apple.com/newsroom/2022/03/apple-unveils-m1-ultra-the-worlds-most-powerful-chip-for-a-personal-computer/.> Accessed Feb. 21, 2023, 9 pages.

* cited by examiner

*Primary Examiner* — Tapas Mazumder

(57) ABSTRACT

A graphics processing unit (GPU) of a processing system is partitioned into multiple dies (referred to as GPU chiplets) that are configurable to collectively function and interface with an application as a single GPU in a first mode and as multiple GPUs in a second mode. By dividing the GPU into multiple GPU chiplets, the processing system flexibly and cost-effectively configures an amount of active GPU physical resources based on an operating mode. In addition, a configurable number of GPU chiplets are assembled into a single GPU, such that multiple different GPUs having different numbers of GPU chiplets can be assembled using a small number of tape-outs and a multiple-die GPU can be constructed out of GPU chiplets that implement varying generations of technology.

16 Claims, 5 Drawing Sheets

CONFIGURABLE MULTIPLE-DIE GRAPHICS PROCESSING UNIT

BACKGROUND

Conventional processing systems include processing units such as a central processing unit (CPU) and a graphics processing unit (GPU) that implement audio, video, and multimedia applications, as well as general purpose computing in some cases. The physical resources of a GPU are typically implemented on a die that includes shader engines and fixed function hardware units that are used to implement user-defined reconfigurable virtual pipelines. As demands on graphics processing units (GPUs) increase, the size, complexity, and cost of manufacturing GPU dies increase commensurately.

The physical resources of a GPU include shader engines and fixed function hardware units that are used to implement user-defined reconfigurable virtual pipelines. For example, a conventional graphics pipeline for processing three-dimensional (3-D) graphics is formed of a sequence of fixed-function hardware block arrangements supported by programmable shaders. These arrangements are usually specified by a graphics application programming interface (API) such as the Microsoft DX 11/12 specifications or Khronos Group OpenGL/Vulkan APIs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
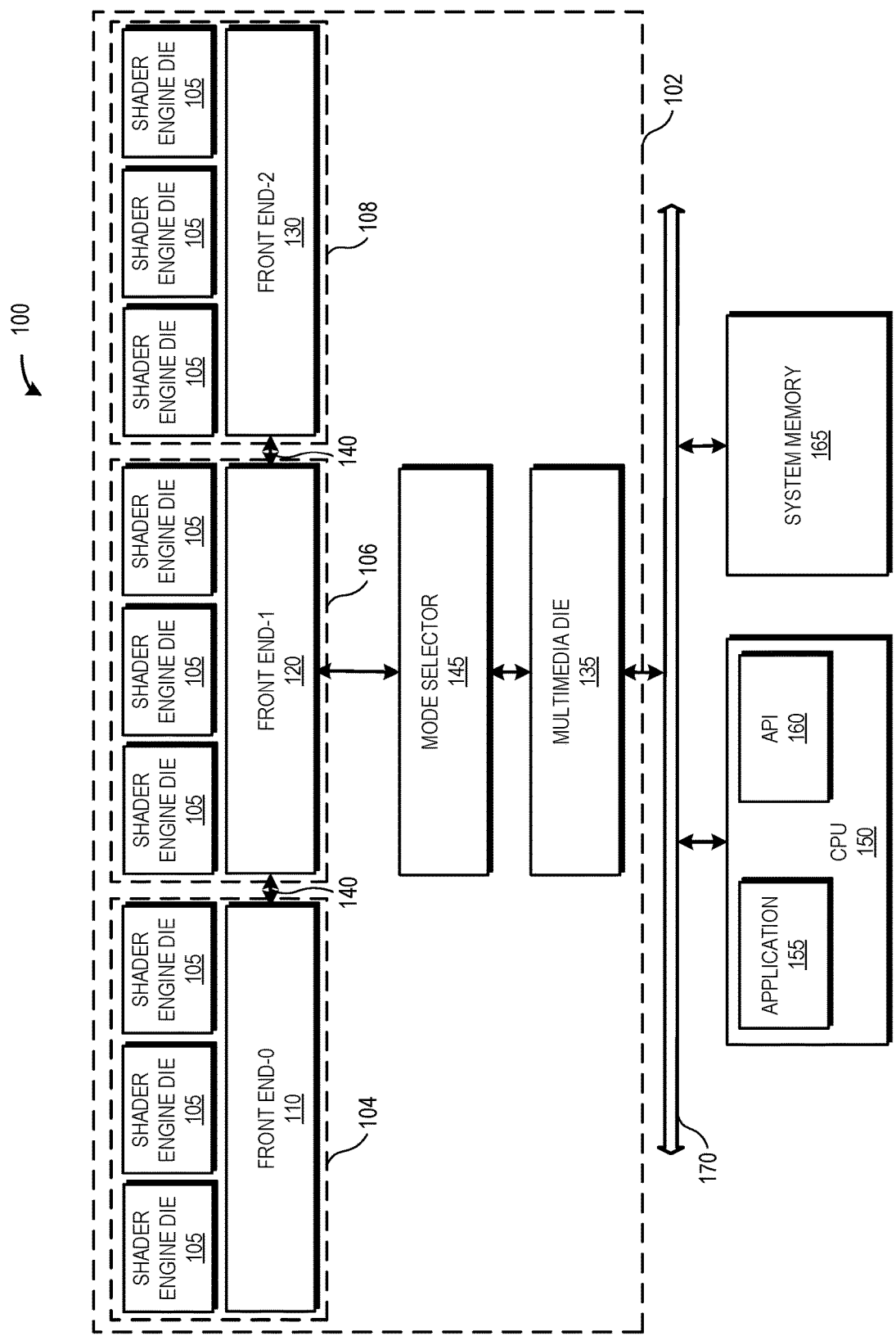
FIG. 1 is a block diagram of a processing system including a graphics processing unit (GPU) that is partitioned into multiple dies in accordance with some embodiments.

As the demands on GPUs and the amount of physical resources needed to satisfy those demands increase, the size of a GPU die becomes a limiting factor, because larger dies are more difficult and expensive to manufacture. FIGS. 1-5 illustrate techniques for partitioning a graphics processing unit (GPU) of a processing system into multiple dies (also referred to herein as GPU chiplets) that are configurable to collectively function and interface with an application as a single GPU in a first mode and as multiple GPUs in a second mode. By dividing the GPU into multiple GPU chiplets, the processing system flexibly and cost-effectively configures an amount of active GPU physical resources based on an operating mode. In addition, a configurable number of GPU chiplets are assembled into a single GPU, such that multiple different GPUs having different numbers of GPU chiplets can be assembled using a small number of tape-outs and a multiple-die GPU can be constructed out of GPU chiplets that implement varying generations of technology.

In various embodiments, and as used herein, the term "chiplet" refers to any device including, but is not limited to, the following characteristics: 1) a chiplet includes an active silicon die containing at least a portion of the computational logic used to solve a full problem (i.e., the computational workload is distributed across multiples of these active silicon dies); 2) chiplets are packaged together as a monolithic unit on the same substrate; and 3) the programming model preserves the concept that the combination of these separate computational dies (i.e., the GPU chiplets) are a single monolithic unit (i.e., each chiplet is not exposed as a separate device to an application that uses the chiplets for processing computational workloads).

Processing on a GPU is typically initiated by application programming interface (API) calls (e.g., draw calls) that are processed by a CPU. A draw call is a command that is generated by the CPU and transmitted to the GPU to instruct the GPU to render an object (or a portion of an object) in a frame. The draw call includes information defining textures, states, shaders, rendering objects, buffers, and the like that are used by the GPU to render the object or portion thereof. In response to receiving a draw call, the GPU renders the object to produce values of pixels that are provided to a display, which uses the pixel values to display an image that represents the rendered object. The object is represented by primitives such as triangles, patches, or other polygons that include multiple vertices connected by corresponding edges. An input assembler fetches the vertices based on topological information indicated in the draw call. The vertices are provided to a graphics pipeline for shading according to corresponding commands that are stored in a command buffer prior to execution by the GPU. The commands in the command buffer are written to a queue (or ring buffer) and a scheduler schedules the command buffer at the head of the queue for execution on the GPU.

The multiple-die GPU is constructed using a configurable number of chiplets that collectively present as a single GPU. The multiple-die GPU includes at least one front end (FE) die, a set of at least two shader engine dies per FE die that execute multiple concurrent graphics streams, and a multimedia die. The FE die fetches primitives for graphics workloads, performs scheduling of the graphics workloads for execution on the shader engines and, in some cases, handles serial synchronization, state updates, draw calls, cache activities, and tessellation of primitives. In some embodiments, the FE includes one or more of a command processor, a graphics register bus hub, a geometry engine, data fabric, a cache, a power controller, a data store, and one or more memory controllers.

The shader engine dies shade the vertices of the primitives (as scheduled by the FE circuitry) and shade the pixels generated based on the shaded primitives. A shader engine is a logical and physical block grouping that includes graphics, compute, and local storage. In some embodiments, each shader engine die includes a shader engine and graphics pipeline. In some embodiments, an FE die selectively schedules the graphics workloads for concurrent execution on the at least two shader engine dies of the multiple-die GPU.

In some embodiments, the multiple-die GPU includes a second FE die and a second set of shader engine dies. If the multiple-die GPU includes two FE dies, a first FE die schedules the graphics workloads for all the shader engine dies (i.e., for both the first and second sets of shader engine dies) in a first operational mode. In a second (partitioned) operational mode, the first FE die schedules the graphics workloads for execution on the first set of the shader engine dies and the second FE die schedules the graphics workloads for execution on the second set of shader engine dies concurrently with execution of the graphics workloads on the first set of shader engine dies.

In some embodiments, the multiple-die GPU includes a third FE die and a third set of shader engine dies. If the multiple-die GPU includes three FE dies, a first FE die schedules the graphics workloads for all the shader engine dies (i.e., for the first, second, and third sets of shader engine dies) in the first operational mode. In the second operational mode, the first FE die schedules the graphics workloads for execution on the first set of the shader engine dies, the second FE die schedules the graphics workloads for execution on the second set of shader engine dies concurrently with execution of the graphics workloads on the first set of shader engine dies, and the third FE die schedules the graphics workloads for execution on the third set of shader engine dies concurrently with execution of the graphics workloads on the first and second sets of shader engine dies. In a third operational mode, the first FE die schedules the graphics workloads for execution on the first and second sets of shader engine dies and the third FE die schedules the graphics workloads for execution on the third set of shader engine dies concurrently with execution of the graphics workloads on the first and second sets of shader engine dies. In some embodiments, the multiple-die GPU includes additional FE dies that schedule graphics workloads for additional sets of shader engine dies in additional operational modes.

FIG. 1 is a block diagram of a processing system 100 that implements a multiple-die graphics processing unit (GPU) 102 according to some embodiments. In various embodiments, the multiple-die GPU 102 is a parallel processor that includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof.

The processing system 100 includes one or more central processing units (CPUs) 150. Although one CPU 150 is shown in FIG. 1, some embodiments of the processing system 100 include more CPUs. A bus 170 supports data flows between endpoints within the processing system 100. Some embodiments of the bus 170 are implemented as a peripheral component interconnect (PCI) bus, PCI-E bus, or other type of bus that supports data flows between connecting points such as peripheral component interface (PCI) physical layers, memory controllers, universal serial bus (USB) hubs, computing and execution units including the multiple-die GPU 102 and the CPU 150, as well as other endpoints. Components of processing system 100 may be implemented as hardware, firmware, software, or any combination thereof. It should be appreciated that processing system 100 may include one or more software, hardware, and firmware components in addition to or different from those shown in FIG. 1. For example, processing system 100 may additionally include one or more input interfaces, non-volatile storage, one or more output interfaces, network interfaces, and one or more displays or display interfaces. The processing system 100 includes, for example, a server, a desktop computer, laptop computer, tablet computer, mobile phone, gaming console, and the like.

In various embodiments, the CPU 150 is connected via the bus 170 to a system memory 165, such as a dynamic random access memory (DRAM). In various embodiments, the system memory 165 can also be implemented using other types of memory including static random access memory (SRAM), nonvolatile RAM, and the like. In the illustrated embodiment, the CPU 150 communicates with the system memory 165 and also the multiple-die GPU 102 over the bus 170. However, some embodiments of the processing system 100 include the multiple-die GPU 102 communicating with the CPU 150 over a direct connection or via dedicated buses, bridges, switches, routers, and the like.

As illustrated, the CPU 150 includes a number of processes, such as executing one or more application(s) 155 to generate graphic commands. In various embodiments, the one or more applications 155 include applications that utilize the functionality of the multiple-die GPU 102, such as applications that generate work in the processing system 100 or an operating system (OS). In some implementations, an application 155 includes one or more graphics instructions that instruct the multiple-die GPU 102 to render a graphical user interface (GUI) and/or a graphics scene. For example, in some implementations, the graphics instructions include instructions that define a set of one or more graphics primitives to be rendered by the multiple-die GPU 102.

In some embodiments, the application 155 utilizes a graphics application programming interface (API) 160 to invoke a user mode driver (not shown) (or a similar GPU driver). The user mode driver issues one or more commands to the multiple-die GPU 102 for rendering one or more graphics primitives into displayable graphics images. Based on the graphics instructions issued by application 155 to the user mode driver, the user mode driver formulates one or more graphics commands that specify one or more operations for multiple-die GPU 102 to perform for rendering graphics. In some embodiments, the user mode driver is a part of the application 155 running on the CPU 150. For example, in some embodiments the user mode driver is part of a gaming application running on the CPU 150. Similarly, in some implementations a kernel mode driver (not shown), alone or in combination with the user mode driver, formulates the one or more graphics commands as part of an operating system running on the CPU 150.

The multiple-die GPU 102 includes three GPU chiplet sets 104, 106, 108. Each GPU chiplet set 104, 106, 108 includes sets of shader engine dies (SE) 105 that are used to receive and execute commands concurrently or in parallel. In some embodiments, each SE die 105 includes a configurable number of shader engines, in which each shader engine includes a configurable number of work group processors, and each work group processor includes a configurable number of compute units. Some embodiments of the SE dies 105 are configured using information in draw calls received from the CPU 150 to shade vertices of primitives that represent a model of a scene. The SE dies 105 also shade the pixels generated based on the shaded primitives and provide the shaded pixels to a display for presentation for user, e.g., via an I/O hub (not shown) of a multimedia die 135. The multimedia die 135 further includes a display engine and a PCIe interface in some embodiments. Although three SE dies 105 are illustrated for each GPU chiplet set 104, 106, 108 such that a total of nine SE dies 105 are shown in FIG. 1, some embodiments of the multiple-die GPU 102 include more or fewer GPU chiplet sets and some embodiments of the GPU chiplet sets 104, 106, 108 include more or fewer shader engine dies 105.

Each set of SE dies 105 in a GPU chiplet set 104, 106, 108 is connected to a front end die (e.g., front end-0 (FE-0) 110, front end-1 (FE-1) 120, and front end-2 (FE-2) 130) that fetches and schedules commands for processing graphics workloads that are received and executed by the shader engines of the SE dies 105. The SE dies 105 of a GPU chiplet set 104, 106, 108 are stacked vertically on top of the corresponding front end die FE-0 110, FE-1 120, FE-2 130 of the GPU chiplet set 104, 106, 108 in some embodiments. In some embodiments, each of the front end dies FE-0 110, FE-1 120, FE-2 130 includes a graphics L2 cache (not shown) that stores frequently used data and instructions. In some embodiments, the L2 cache is connected to one or more L1 caches that are implemented in the SE dies 105 and one or more L3 caches (or other last level caches) implemented in the processing system 100. The caches collectively form a cache hierarchy.

Each of the front end dies FE-0 110, FE-1 120, FE-2 130 in the GPU 102 fetches primitives for graphics workloads, performs scheduling of the graphics workloads for execution on the shader engine dies 105 and, in some cases, handles serial synchronization, state updates, draw calls, cache activities, and tessellation of primitives. Each of the FE dies FE-0 110, FE-1 120, FE-2 130 in the GPU 102 includes command processors (not shown) that receive command buffers for execution on the SE dies 105. Each of the FE dies FE-0 110, FE-1 120, FE-2 130 also includes graphics register bus managers (GRBMs) (not shown) that act as hubs for register read and write operations. The FE dies FE-0 110, FE-1 120, FE-2 130 thus fetch commands for processing graphics workloads for respective sets of SE dies 105. The SE dies 105 each include shader engines that are configured to receive and execute the commands from the respective FE dies FE-0 110, FE-1 120, FE-2 130.

In the depicted embodiment of FIG. 1, a bridge chiplet 140 communicably couples the GPU chiplet sets 104, 106, 108 to each other. Although three GPU chiplet sets 104, 106, 108 are shown in FIG. 1, the number of GPU chiplets sets in the multiple-die GPU 102 is a matter of design choice and varies in other embodiments, such as described in more detail below. In various embodiments, the bridge chiplet 140 includes a silicon bridge that serves as a high-bandwidth die-to-die interconnect between GPU chiplet dies. In some embodiments, the bridge chiplet 140 includes passive circuitry. In some embodiments, the bridge chiplet 140 operates as a memory crossbar with a shared, unified last level cache (LLC) to provide inter-chiplet communications and to route cross chiplet synchronization signals. Caches are naturally an active component (i.e., require electrical power for operations), so in such embodiments, the memory crossbar (e.g., the bridge chiplet 140) is active for holding those cache memories. Cache sizing is therefore configurable, as a function of the physical size of the bridge chiplet 140, for different applications along with different chiplet configurations.

The bridge chiplet 140 includes a plurality of internal conductor traces (not shown), which in different embodiments is on a single level or multiple levels as desired. The traces interface electrically with, for example, conductor structures of the PHY regions of the GPU chiplet sets 104, 106, 108 by way of conducting pathways. In this manner, the bridge chiplet 140 is a bridge die that communicably couples and routes communications between the GPU chiplet sets 104, 106, 108, thereby forming a routing network.

As a general operational overview, in some embodiments the CPU 150 is communicably coupled to a single GPU chiplet set (i.e., GPU chiplet set 106) through the bus 170 via the multimedia die 135. CPU-to-GPU transactions or communications from the CPU 150 to the multiple-die GPU 102 are received at the GPU chiplet set 106. Subsequently, any inter-chiplet set communications are routed through the bridge chiplet 140 as appropriate to access memory channels on other GPU chiplet sets 104, 108. In this manner, the multiple-die GPU 102 includes GPU chiplet sets 104, 106, 108 that are addressable as a single, monolithic GPU from a software developer's perspective (e.g., the CPU 150 and any associated applications/drivers are unaware of the chiplet-based architecture), and therefore avoids requiring any chiplet-specific considerations on the part of a programmer or developer.

The multiple-die GPU 102 is operable in multiple modes. A mode selector 145 determines the operation mode of the multiple-die GPU 102. The mode selector 145 selectively connects the FE dies FE-0 110, FE-1 120, FE-2 130 to the SE dies 105 of each of the GPU chiplet sets 104, 106, 108, depending on the mode in which the multiple-die GPU 102 is operating, as explained in more detail below.

Figure 2:
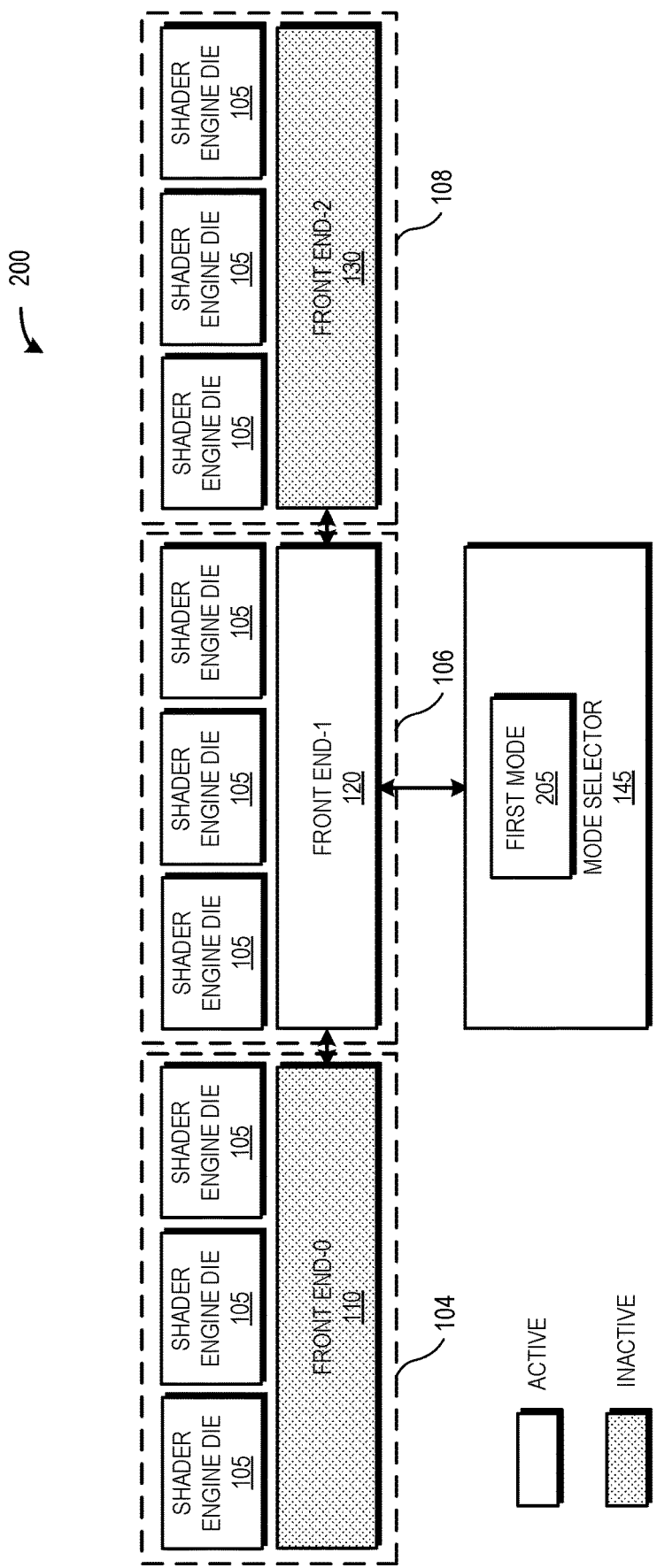
FIG. 2 is a block diagram of a GPU that is partitioned into multiple dies operating in a first mode in accordance with some embodiments.

FIG. 2 is a block diagram of a mapping 200 of FE dies FE-0 110, FE-1 120, FE-2 130 to a set of SE dies 105 for the multiple-die GPU 102 operating in a first mode 205 according to some embodiments. The mapping 200 indicates a mapping of some embodiments of the FE dies FE-0 110, FE-1 120, FE-2 130 to a set of SE dies 105 for the multiple-die GPU 102 shown in FIG. 1. The mode selector 145 acts as a partition switch that controls which FE die fetches and schedules commands for each of the sets of SE dies 105 associated with each of the GPU chiplet sets 104, 106, 108. The SE dies 105 receive and execute the commands received from the FE die(s) indicated by the mode selected by the mode selector 145. In some embodiments, the mode selector 145 includes multiplexing hardware to control the scheduling of commands from one or more of the FE dies FE-0 110, FE-1 120, FE-2 130.

The multiple-die GPU 102 is operating in the first mode 205 and the front end die FE-1 120 is mapped to all the SE dies 105 of each of the GPU chiplet sets 104, 106, 108. The front end die FE-1 120 therefore fetches and schedules commands for concurrent execution on all of the SE dies 105. In the first mode 205, the FE dies FE-0 110 and FE-2 130 are not mapped to any of the SE dies 105 and therefore are considered inactive. In the first mode 205, the FE dies FE-0 110 and FE-2 130 do not fetch or schedule commands for execution on any of the SE dies 105, as indicated by the shading of the boxes representing the FE dies FE-0 110 and FE-2 130. Thus, in the first mode 205, a single front end die FE-1 120 fetches and schedules commands for execution at all of the SE dies 105.

Figure 3:
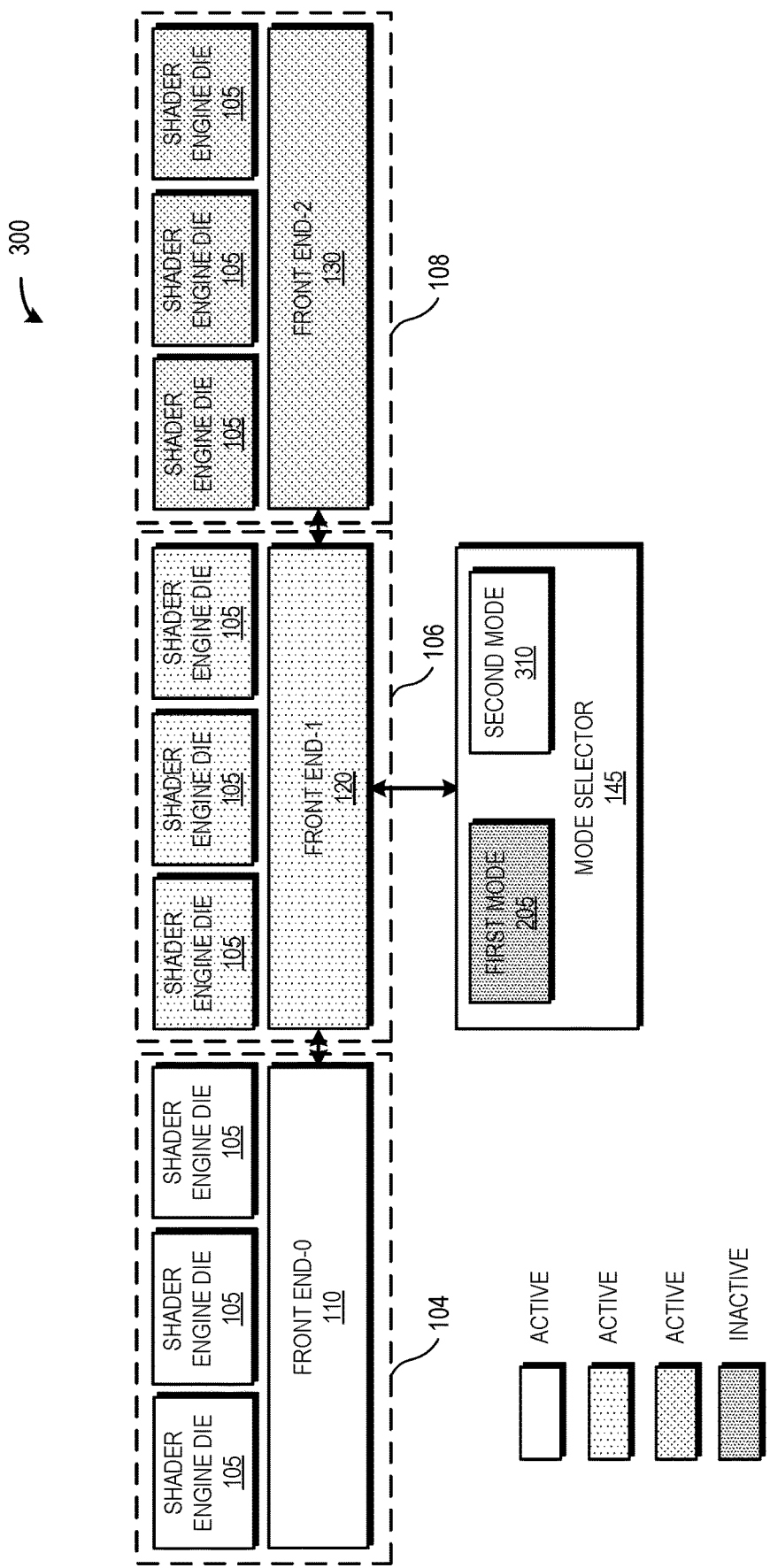
FIG. 3 is a block diagram of a GPU that is partitioned into multiple dies operating in a second mode in accordance with some embodiments.

FIG. 3 is a block diagram of a mapping 300 of FE dies FE-0 110, FE-1 120, FE-2 130 to respective sets of SE dies 105 for the multiple-die GPU 102 operating in a second mode 310 according to some embodiments. The mapping 300 indicates a mapping of some embodiments of the FE dies FE-0 110, FE-1 120, FE-2 130 to respective sets of SE dies 105 for the multiple-die GPU 102 shown in FIG. 1. The multiple-die GPU 102 is operating in the second mode 310 and each of the front end dies FE-0 110, FE-1 120, FE-2 130 is mapped to the SE dies 105 of the respective GPU chiplet sets 104, 106, 108 that include the front end dies FE-0 110, FE-1 120, FE-2 130. Thus, the front end die FE-0 110 fetches and schedules commands for concurrent execution on the SE dies 105 of the GPU chiplet set 104, the front end die FE-1 120 fetches and schedules commands for concurrent execution on the SE dies 105 of the GPU chiplet set 106, and the front end die FE-2 130 fetches and schedules commands for concurrent execution on the SE dies 105 of the GPU chiplet set 108, as indicated by the shading of the boxes representing the FE dies FE-0 110, FE-1 120, FE-2 130, and the respective sets of SE dies 105. In the second mode 310, each of the FE dies FE-0 110, FE-1 120, and FE-2 130 are mapped to respective sets of SE dies 105 and therefore are considered active.

In some embodiments, the multiple-die GPU 102 includes only two GPU chiplet sets, e.g., GPU chiplet sets 104, 106. In such embodiments, in the second mode 310, the front end die FE-0 110 fetches and schedules commands for concurrent execution on the SE dies 105 of the GPU chiplet set 104, and the front end die FE-1 120 schedules commands for concurrent execution on the SE dies 105 of the GPU chiplet set 106. In other embodiments, the multiple-die GPU 102 includes additional GPU chiplet sets, and in the second mode 310, each front end die of a GPU chiplet set fetches and schedules commands for concurrent execution on the SE dies 105 of the GPU chiplet set that includes the front end die.

Figure 4:
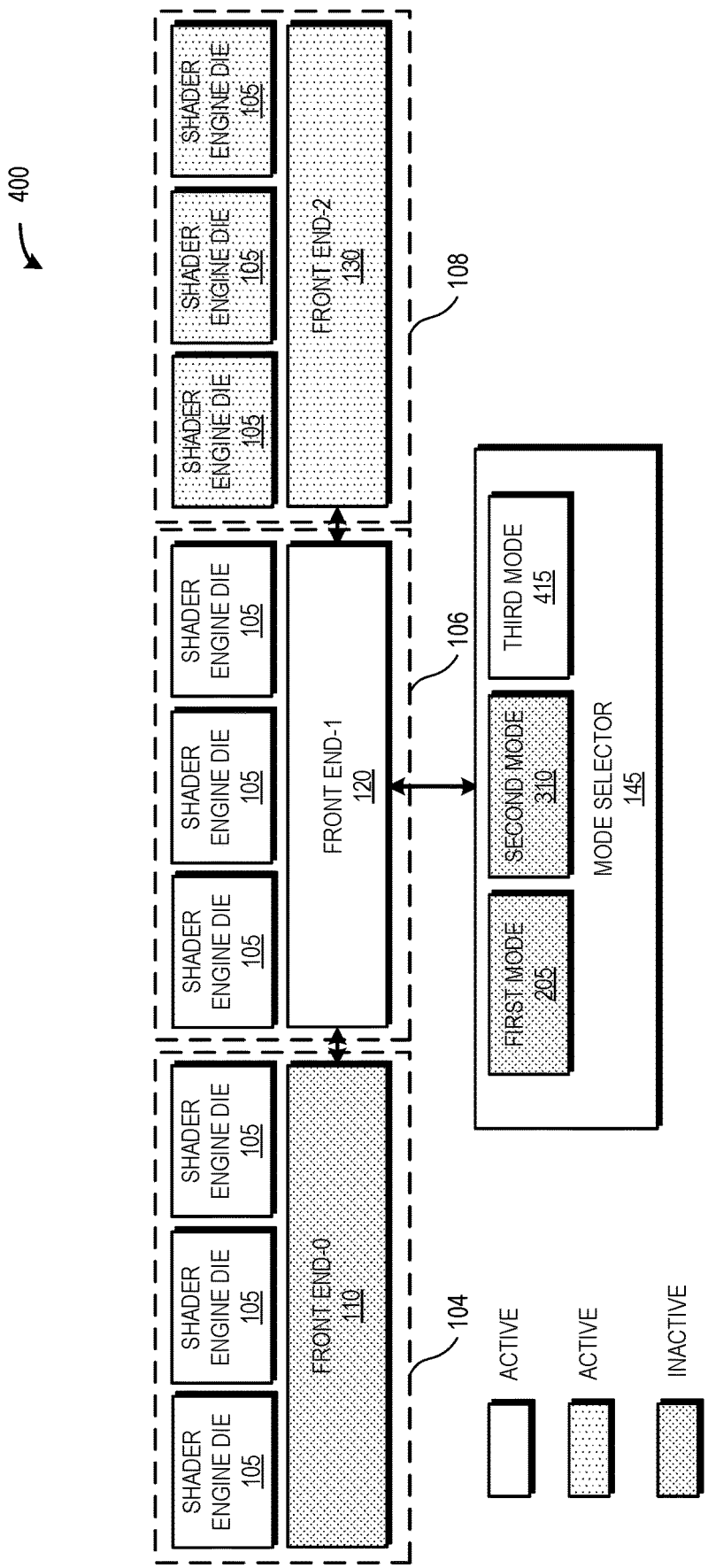
FIG. 4 is a block diagram of a GPU that is partitioned into multiple dies operating in a third mode in accordance with some embodiments.

FIG. 4 is a block diagram of a mapping 400 of FE dies FE-0 110, FE-1 120, FE-2 130 to respective sets of SE dies 105 for the multiple-die GPU 102 operating in a third mode 415 according to some embodiments. The mapping 400 indicates a mapping of some embodiments of the FE dies FE-0 110, FE-1 120, FE-2 130 to respective sets of SE dies 105 for the multiple-die GPU 102 shown in FIG. 1. The multiple-die GPU 102 is operating in the third mode 415 and the front end die FE-1 120 is mapped to the SE dies 105 of the GPU chiplet sets 104, 106, while FE-2 130 is mapped to the SE dies 105 of the GPU chiplet set 108 and FE-0 110 is inactive. Thus, the front end die FE-1 120 schedules commands for concurrent execution on the SE dies 105 of the GPU chiplet sets 104, 106, and the front end die FE-2 130 schedules commands for concurrent execution on the SE dies 105 of the GPU chiplet set 108, as indicated by the shading of the boxes representing the FE dies FE-0 110, FE-1 120, FE-2 130, and the respective sets of SE dies 105. In the third mode 415, each of the FE dies FE-1 120 and FE-2 130 are mapped to respective sets of SE dies 105 and therefore are considered active.

In some embodiments, the multiple-die GPU 102 includes additional GPU chiplet sets, and in the third mode 415, each front end die of a GPU chiplet set is mapped to respective sets of SE dies 105 and fetches and schedules commands for concurrent execution on the SE dies 105 to which the front end die is mapped. Thus, for example, if the multiple-die GPU 102 includes four GPU chiplet sets and each GPU chiplet set includes a front end die and multiple SE dies 105, in some embodiments, a first front end dies is mapped to the SE dies 105 of the first front end die and a second front end die, the second front end die is inactive, and third and fourth front end dies are each mapped to their respective SE dies 105. As more GPU chiplet sets are included in the multiple-die GPU 102, additional mappings of front end dies to SE dies 105 are possible.

Figure 5:
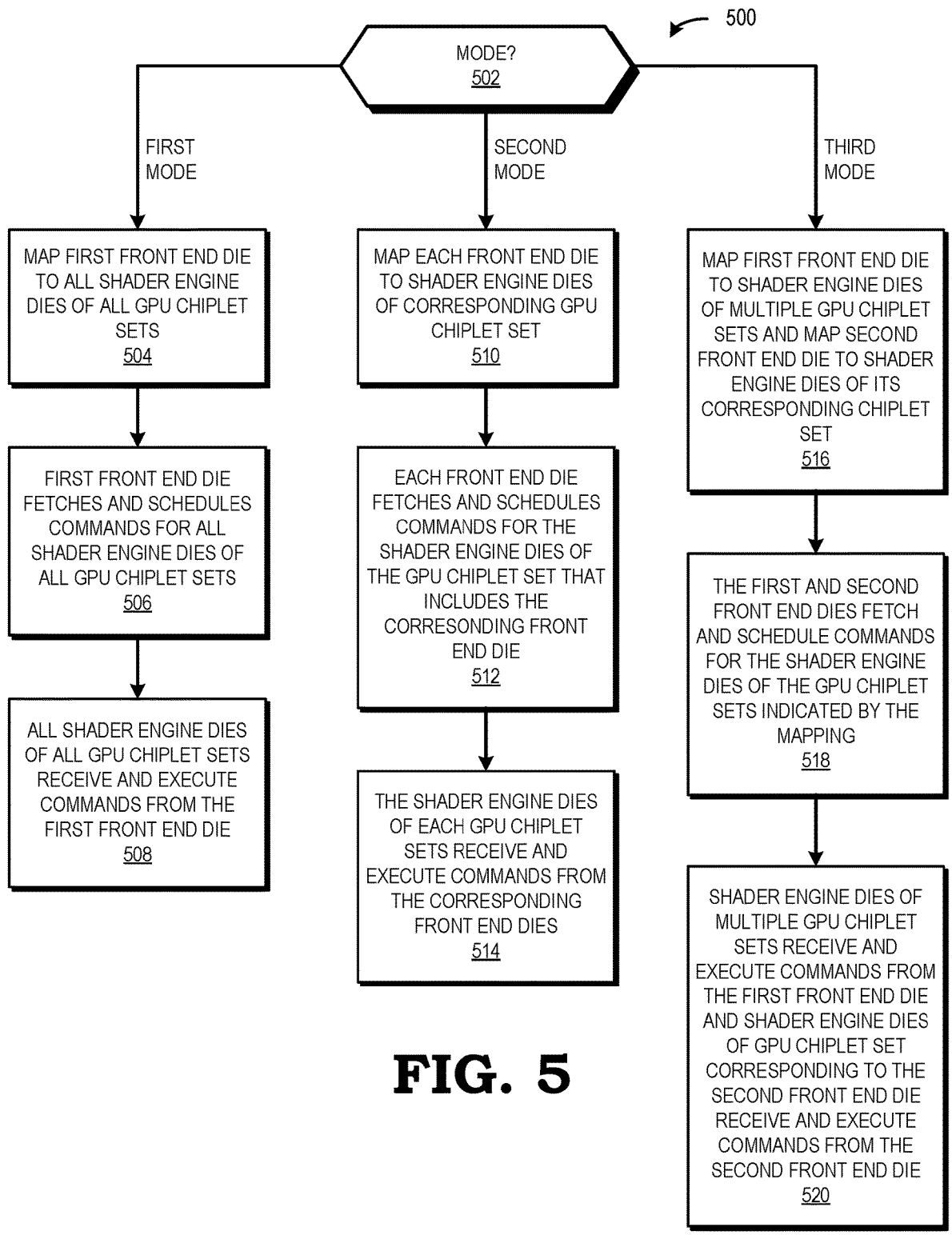
FIG. 5 is a flow diagram illustrating a method for fetching commands at a front end processor die for a plurality of shader engine dies in accordance with some embodiments.

FIG. 5 is a flow diagram illustrating a method 500 for fetching commands at a front end processor die for a plurality of shader engine dies in accordance with some embodiments. At block 502, an operational mode of the multiple-die GPU 102 is determined. If, at block 502, the operational mode is determined to be the first mode 205, the method flow continues to block 504. At block 504, the mode selector 145 enables a mapping 200 in which the front end die FE-1 120 is mapped to all the SE dies 105 of each of the GPU chiplet sets 104, 106, 108. At block 506, the front end die FE-1 120 fetches and schedules commands for concurrent execution on all of the SE dies 105 of all of the GPU chiplet sets 104, 106, 108. At block 508, all of the SE dies 105 of all of the GPU chiplet sets 104, 106, 108 receive and execute the commands received from the front end die FE-1 120.

If, at block 502, the operational mode is determined to be the second mode 310, the method flow continues to block 510. At block 510, the mode selector 145 enables a mapping 300 in which each front end die FE-0 110, FE-1 120, FE-2 130 is mapped to the SE dies 105 of the corresponding GPU chiplet set 104, 106, 108. Thus, the front end die FE-0 110 is mapped to the SE dies 105 of the GPU chiplet set 104, the front end die FE-1 120 is mapped to the SE dies 105 of the GPU chiplet set 106, and the front end die FE-2 130 is mapped to the SE dies 105 of the GPU chiplet set 108. At block 512, the front end die FE-0 110 fetches and schedules commands for concurrent execution at the SE dies 105 of the GPU chiplet set 104, the front end die FE-1 120 fetches and schedules commands for concurrent execution at the SE dies 105 of the GPU chiplet set 106, and the front end die FE-2 130 fetches and schedules commands for concurrent execution at the SE dies 105 of the GPU chiplet set 108. In embodiments having additional GPU chiplet sets, the front end die for each GPU chiplet set fetches and schedules commands for concurrent execution at the SE dies 105 of its respective GPU chiplet set. At block 514, the SE dies 105 of the GPU chiplet set 104 receive and execute the commands received from the front end die FE-0 110, the SE dies 105 of the GPU chiplet set 106 receive and execute the commands received from the front end die FE-1 120, and the SE dies 105 of the GPU chiplet set 108 receive and execute the commands received from the front end die FE-2 130. In embodiments having additional GPU chiplet sets, the SE dies 105 of each additional GPU chiplet set receive and execute the commands received from the front end die of the respective GPU chiplet set.

If, at block 502, the operational mode is determined to be the third mode 415, the method flow continues to block 516. At block 516, the mode selector 145 enables a mapping 400 in which the front end die FE-1 120 is mapped to multiple GPU chiplet sets 104, 106, 108 and the front end die FE-2 130 is mapped to the SE dies 105 of the GPU chiplet set 108 that includes the front end die FE-2 130. For example, in some embodiments, the mapping 400 of the third mode 415 specifies that the front end die FE-0 110 is inactive, the front end die FE-1 120 is mapped to the SE dies 105 of the GPU chiplet sets 104, 106, and FE-2 130 is mapped to the SE dies 105 of the corresponding GPU chiplet set 108. At block 518, the front end die FE-1 120 fetches and schedules commands for concurrent execution at the SE dies 105 of the GPU chiplet sets 104, 106, and the front end die FE-2 130 fetches and schedules commands for concurrent execution at the SE dies 105 of the GPU chiplet set 108. In embodiments having additional GPU chiplet sets, the front end die for each GPU chiplet set fetches and schedules commands for concurrent execution at the SE dies 105 of each GPU chiplet set to which the front end die is mapped. At block 520, the SE dies 105 of the GPU chiplet sets 104, 106 receive and execute the commands received from the front end die FE-1 120, and the SE dies 105 of the GPU chiplet set 108 receive and execute the commands received from the front end die FE-2 130. In embodiments having additional GPU chiplet sets, the SE dies 105 of each additional GPU chiplet set receive and execute the commands received from the front end die of the respective GPU chiplet set to which the SE dies 105 are mapped.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A parallel processor, comprising:
  a first chiplet set comprising:
    a first front end processor die configured to fetch commands for processing graphics workloads; and
    a first plurality of shader engine dies, wherein the first plurality comprises a configurable number of shader engine dies and wherein each shader engine die comprises a plurality of shader engines and is configured to receive and execute commands from the first front end processor die; and
  a second chiplet set comprising:
    a second front end processor die configured to fetch commands for processing graphics workloads; and
    a second plurality of shader engine dies, wherein the second plurality comprises a configurable number of shader engine dies and wherein each shader engine die comprises a plurality of shader engines and is configured to receive and execute commands from the first front end processor die in a first mode and receive and execute commands from the second front end processor die in a second mode, wherein the first chiplet set and the second chiplet set collectively interface with an application as a single parallel processor in the first mode and as multiple parallel processors in the second mode.

2. The parallel processor of claim 1, further comprising:
  a third chiplet set comprising:
    a third front end processor die configured to fetch commands for processing graphics workloads; and
    a third plurality of shader engine dies, wherein the third plurality comprises a configurable number of shader engine dies and wherein each shader engine die comprises a plurality of shader engines and is configured to receive and execute commands from the first front end processor die in the first mode.

3. The parallel processor of claim 2, wherein each shader engine die of the third plurality of shader engine dies is configured to receive and execute commands from the third front end processor die in the second mode.

4. The parallel processor of claim 3, wherein each shader engine die of the first plurality of shader engine dies and the second plurality of shader engine dies is configured to receive and execute commands from the first front end processor and each shader engine die of the third plurality of shader engine dies is configured to receive and execute commands from the third front end processor die in a third mode.

5. The parallel processor of claim 1, further comprising:
a multimedia die comprising a display engine and a PCIe interface.

6. The parallel processor of claim 1, wherein the first front end processor die comprises at least one of: a command processor, a graphics register bus hub, a geometry engine, data fabric, a cache, a power controller, a data store, and one or more memory controllers.

7. The parallel processor of claim 1, wherein each shader engine comprises a plurality of compute units.

8. An apparatus, comprising:
a first chiplet set comprising:
 a first subset of a plurality of shader engine dies, wherein the plurality comprises a configurable number of shader engine dies and wherein each shader engine die comprises a plurality of shader engines; and
 a first front end processor die configured to fetch commands for processing graphics workloads for the plurality of shader engine dies in a first mode; and
a second chiplet set comprising:
 at least one second front end processor die, wherein the first front end processor die is configured to fetch commands for processing graphics workloads for the first subset of the plurality of shader engine dies and the at least one second front end processor die is configured to fetch commands for processing graphics workloads for a second subset of the plurality of shader engine dies in a second mode, wherein the first chiplet set and the second chiplet set collectively interface with an application as a single parallel processor in the first mode and as multiple parallel processors in the second mode.

9. The apparatus of claim 8, further comprising:
a bridge to connect the first front end processor die to the at least one second front end processor die.

10. The apparatus of claim 8, wherein each of the first front end processor die and the second front end processor die comprises at least one of: a command processor, a graphics register bus hub, a geometry engine, data fabric, a cache, a power controller, a data store, and one or more memory controllers.

11. The apparatus of claim 8, further comprising:
a multimedia die comprising a display engine and a PCIe interface.

12. The apparatus of claim 8, wherein each shader engine comprises a plurality of compute units.

13. A method, comprising:
fetching commands for processing graphics workloads at a first front end processor die of a first chiplet set;
receiving and executing the commands from the first front end processor die at a first plurality of shader engine dies of the first chiplet set, wherein the first plurality comprises a configurable number of shader engine dies and wherein each shader engine die comprises a plurality of shader engines;
receiving and executing the commands from the first front end processor die at a second plurality of shader engine dies of a second chiplet set in a first mode, wherein the second plurality comprises a configurable number of shader engine dies;
fetching commands for processing graphics workloads at a second front end processor die of the second chiplet set; and
receiving and executing the commands from the first front end processor die at the first plurality of shader engine dies and receiving and executing the commands from the second front end processor die at the second plurality of shader engine dies in a second mode, wherein the first chiplet set and the second chiplet set collectively interface with an application as a single parallel processor in the first mode and as multiple parallel processors in the second mode.

14. The method of claim 13, further comprising:
receiving and executing the commands from the first front end processor die at a third plurality of shader engine dies of a third chiplet set in the first mode, wherein the third plurality comprises a configurable number of shader engine dies.

15. The method of claim 14, further comprising:
fetching commands for processing graphics workloads at a third front end processor die of the third chiplet set; and
receiving and executing the commands from the third front end processor die at the third plurality of shader engine dies in the second mode.

16. The method of claim 15, further comprising:
receiving and executing the commands from the first front end processor die at the first plurality and the second plurality of shader engine dies and receiving and executing the commands from the third front end processor die at the third plurality of shader engine dies in a third mode.

* * * * *